United States Patent [19]

Sullivan

[11] 4,051,607
[45] Oct. 4, 1977

[54] CELESTIAL DISPLAY DEVICE

[76] Inventor: Roger J. Sullivan, 371 N. Edison St., Arlington, Va. 22203

[21] Appl. No.: 716,126

[22] Filed: Aug. 20, 1976

[51] Int. Cl.$^2$ .......................... G09B 27/06; A63F 9/10
[52] U.S. Cl. ........................................... 35/43; 35/47; 273/157 R
[58] Field of Search ................ 35/46 R, 46 A, 47, 42, 35/43; 273/156, 157 R, 157 A

[56] References Cited

U.S. PATENT DOCUMENTS

| 2,083,988 | 6/1937 | Dupler | 35/46 R |
|---|---|---|---|
| 2,117,946 | 5/1938 | Cresswell et al. | 35/46 R |
| 3,032,345 | 5/1962 | Lemelson | 273/95 R X |
| 3,037,300 | 6/1962 | Grosser | 35/46 A |
| 3,046,677 | 7/1962 | Patella | 35/47 |
| 3,618,955 | 11/1971 | Barnes | 273/157 R |

Primary Examiner—William H. Grieb
Attorney, Agent, or Firm—Thompson, Birch, Gauthier & Samuels

[57] ABSTRACT

A celestial display device having at least one box-like support member formed with a concave, hemispherical upper surface. A plurality of jigsaw puzzle pieces having convex lower surfaces are adapted to be removably affixed to the concave support member surface. The puzzle pieces have representations of celestial indicia on their upper surfaces and are assembled together on the support member to create a coherent celestial object display.

13 Claims, 2 Drawing Figures

U.S. Patent  Oct. 4, 1977  4,051,607
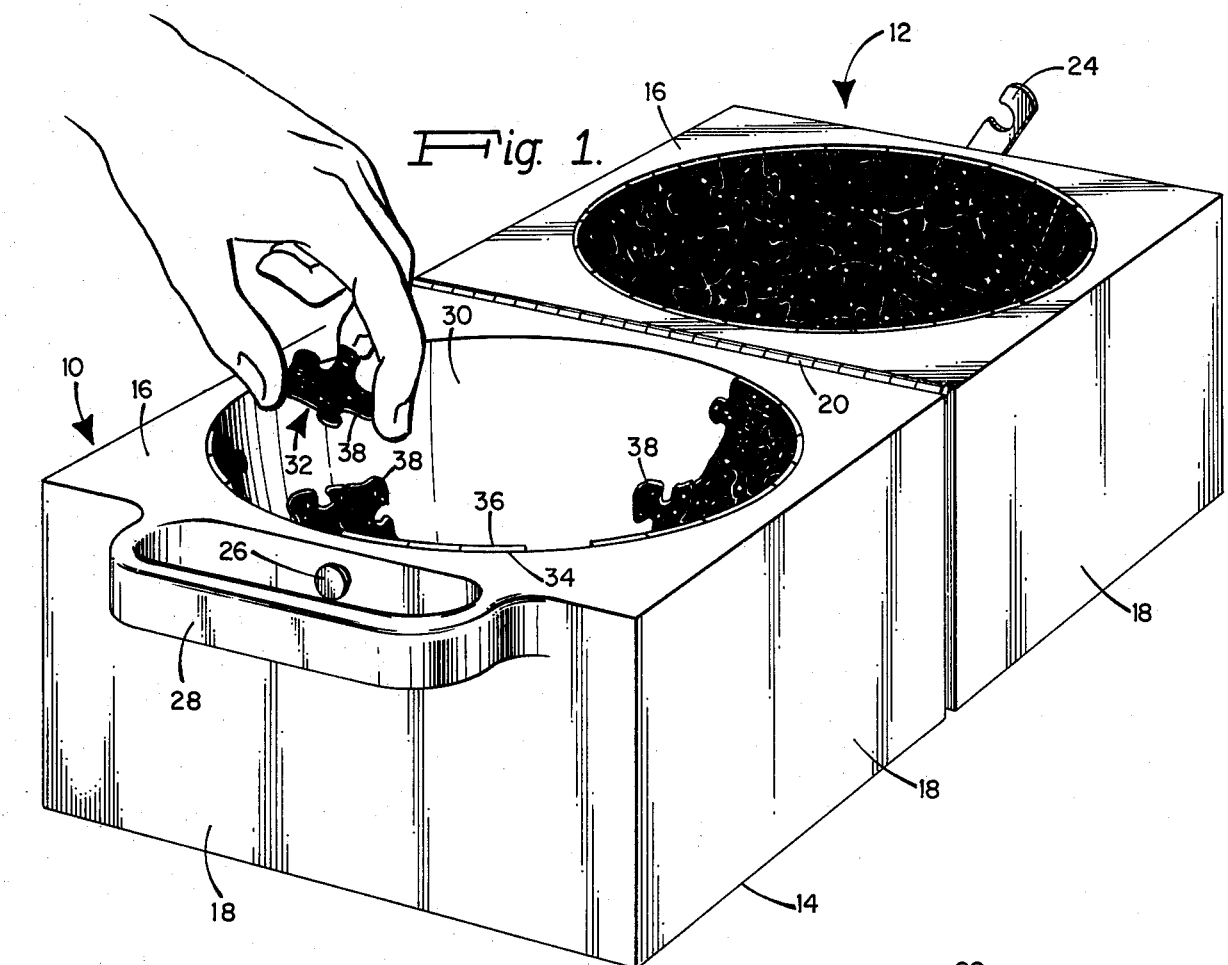
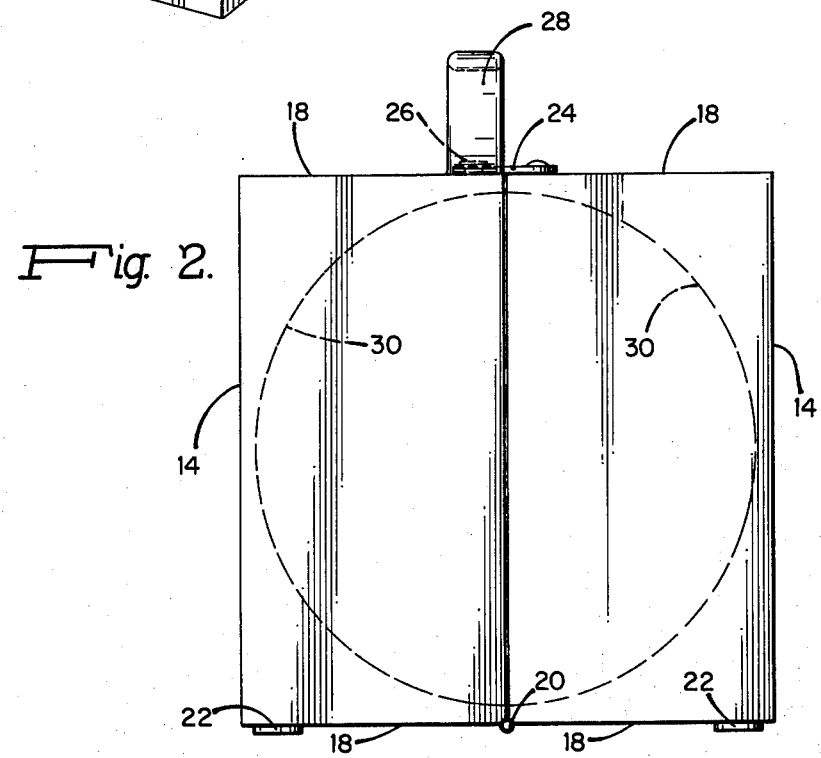

CELESTIAL DISPLAY DEVICE

BACKGROUND OF THE INVENTION

In the past, there have been many educational devices which utilized the exterior surface of a sphere onto which jigsaw puzzle pieces were magnetically placed or otherwise affixed to illustrate global geography. An example is U.S. Pat. No. 3,618,955. Also, there have been educational devices which utilized the interior surface of a sphere or the interior surface of a hemisphere onto which celestial indicia were either painted, printed or otherwise graphically reproduced. An example is U.S. Pat. No. 3,046,677.

However, so far as is known to the present inventor, there have been no previous educational devices which utilized the concave interior surface of a hemisphere onto which jigsaw puzzle pieces bearing celestial indicia have been removably affixed to illustrate celestial spatial relationships.

SUMMARY OF THE INVENTION

The preferred embodiment of this invention comprises two box-like support members having concave, hemispherical upper surfaces. The plurality of jigsaw pieces have irregular side edges so that they can be interlocked together in conventional jigsaw puzzle fashion. The lower surfaces of the puzzle pieces and the upper surfaces of the support members are correspondingly curved and include means for removable engagement. The puzzle pieces bear celestial indicia such as constellations and stars.

The support members are constructed like a suitcase. That is, the support members are hinged together with their concave surfaces facing each other when the suitcase is closed. A latch is provided to maintain the suitcase in the closed position and a handle is provided for carrying the closed suitcase.

DESCRIPTION OF THE DRAWINGS

The preferred embodiment of the invention is shown in the drawings as follows:

FIG. 1 is a perspective view of the celestial display device in the open position. The puzzle pieces have been completely assembled on one hemispherical support member, and have been partially assembled on the other hemispherical support member.

FIG. 2 is an elevational view taken along the hinge axis and shows the device in the closed position. The puzzle pieces would normally be contained within the hollow central interior of the closed suitcase.

DESCRIPTION OF THE PREFERRED EMBODIMENT

It will be understood that the basic embodiment of this invention simply comprises a portion of a sphere, such as a hemisphere, having a concave upper surface, a plurality of puzzle pieces having convex lower surfaces, and means for removably attaching the puzzle pieces to the hemisphere's concave surface. However, the preferred embodiment of the invention, which is shown in the drawings, provides two hemispheres arranged in a suitcase configuration for ease of use, ease of secure puzzle piece storage, and ease of transportation. It will be appreciated that the use of directional terms, such as upper, lower, top, bottom, etc., is solely to simplify the description, and is not intended to be limiting in any way.

FIG. 1 shows the left support member 10 and the right support member 12. These box-shaped support members can be made from a wide variety of materials, including plastic, and both have a horizontal bottom wall 14, a horizontal top wall 16, and four vertical side walls 18. These substantially identical support members are hinged together by a piano hinge 20 in the plane of their top walls 16 and in the plane of one of their side walls 18.

The support members are designed to rest on their bottom walls 14 in the open position (FIG. 1) and are designed to rest on small feet 22 fixed to their side walls 18 in the closed position (FIG. 2).

The support members are latched together by a pivoting latch finger 24 which engages a fixed latch pin 26. Latch finger 24 is pivotally attached to the right support member's side wall 18, and latch pin 26 is mounted on the left support member's side wall 18. When unlatched, as shown in FIG. 1, the support members assume an open position in which both bottom walls 14 are substantially co-planar and rest on the underlying surface. When latched, as shown in FIG. 2, the support members assume a closed position in which both bottom walls 14 are substantially parallel and spaced-apart.

A handle 28 is provided on the side wall 18 of the left support member 10. It will be seen in FIG. 2 that the support members operate in the manner of a suitcase. That is, because of the hinge, latch finger, latch pin, and handle, the support members open, close, and are carried in the manner of a conventional suitcase.

The top wall 16 of each support member of the preferred embodiment has a concave, hemispherical, unobstructed, upper surface 30. Preferably, upper surface 30 is made from either magnetic material (i.e. material which is capable of being attached to a magnet) or Velcro material (a separable fastening material sold by Velcro, Inc. of Manchester, N. H.).

A plurality of puzzle pieces 32 are provided. Each puzzle piece has a convex lower surface 34 and a concave upper surface 36. Lower surface 34 is shaped to conform to the concave curvature of upper surface 30 of the support member. Preferably, lower surface 34 has magnets or Velcro material on its lower side. By this arrangement, the puzzle pieces are magnetically attracted or Velcro-fastened to the concave upper surface 30. Alternatively, other holding means are employed, such as pins in bores, snaps, clips, etc. Actually, even gravity will serve to removably maintain the puzzle pieces against the concave upper surface of a suitably oriented support member.

The upper surface 36 of each puzzle piece is preferably covered with a representation of a portion of the celestial sphere. Each puzzle piece may be shaped so as to be covered with an identifiable unitary celestial grouping, such as a constellation, or it may be shaped so as to be covered with a less easily identifiable partial celestial grouping. In either event, the side edges 38 of the puzzle pieces are shaped to fit and interlock with the side edges of adjacent puzzle pieces in the manner of a jigsaw puzzle. The interlocked puzzle pieces form a unitary hemispherical puzzle which illustrates celestial phenomena.

Alternatively, the side edges 38 may be relatively straight so that each puzzle piece has the shape of a trapezoidal spherical segment bounded by longitudinal and latitudinal grid lines. Another alternative is to provide each puzzle piece with side edges that are neither straight nor interlocking. Instead, the side edges are curved and simply fit snugly against the correspondingly curved side edges of the adjacent puzzle pieces.

The puzzle pieces can be assembled together and then left in place on the concave upper surface 30. Alternatively, after assembly, the puzzle pieces can be removed from upper surface 30 and either left loose or placed in a small bag which is then kept within the hollow center of the hemisphere. In either situation, the stored puzzle pieces will be securely protected when the support members are closed and latched (see FIG. 2) in the manner of a suitcase.

The preferred celestial display device of this invention does not require the observer to place all or part of himself within the hemisphere. Furthermore, the celestial indicia are "forward" reading instead of "backward" reading. The puzzle pieces and the support member upper surface are preferably opaque, although it would be possible to illumine the interior of the support member and to make selected portions of the puzzle pieces and the upper surface light-transmitting.

The celestial display device is a splendid educational tool for teaching both children and adults about astronomy. The chief advantage of the device is that celestial phenomena can be observed and studied in the same manner as they are observed from the Earth looking towards the sky. Also, the puzzle pieces can be arranged on the underlying hemisphere in an infinite number of orientations, so that any point of the celestial sphere may be selected to lie at the "south pole" of the hemisphere. Therefore, the observer can assemble the puzzle in a selected orientation so that the resulting celestial display represents the stellar pattern as seen from the Earth from any selected latitude and longitude at a selected time. This feature enhances the educational value of the invention.

The above description obviously suggests many possible variations and modifications of this invention which would not depart from its spirit and scope. It should be understood, therefore, that the invention is not limited in its application to the details of structure specifically described or illustrated and that within the scope of the appended claims, it may be practiced otherwise than as specifically described or illustrated.

I claim:

1. A celestial display device comprising:
   a. a support member having a concave, unobstructed upper surface, said upper surface being substantially shaped as a portion of a sphere;
   b. a plurality of puzzle pieces having convex lower surfaces conforming to the concave curvature of said support member upper surface, said puzzle pieces having concave upper surfaces bearing celestial indicia, each said puzzle piece having side edges shaped to correspond with and to closely fit against the side edges of other said puzzle pieces to form a unitary puzzle in the shape of said upper surface when assembled together; and
   c. said support member and said plurality of puzzle pieces including holding means for causing said puzzle piece lower surfaces to be removably maintained against said support member upper surface.

2. The device of claim 1 wherein said support member upper surface is substantially hemispherical.

3. The device of claim 2 wherein said support member has the shape of a box having a horizontal bottom wall, four vertical side walls and a horizontal top wall, said concave support member upper surface being formed in said horizontal top wall.

4. The device of claim 3 further characterized by the provision of an additional substantially identical box-shaped support member, and means for affixing said two support members together.

5. The device of claim 4 wherein said affixing means includes a hinge attached to both of said support members, said support members having an open position in which the horizontal bottom walls of both of said support members are substantially coplanar, said support members having a closed position in which the horizontal bottom walls of both of said support members are substantially parallel and spaced-apart.

6. The device of claim 5 wherein said affixing means includes latching means attached to both of said support members, said latching means having an unlatched mode in which both of said support members are free to hingedly pivot to their open position, said latching means having a latched mode in which both of said support members are retained together in their closed position.

7. The device of claim 4 further characterized by a handle attached to a support member side wall, said device functioning in the manner of a suitcase to enclose said puzzle pieces for safekeeping.

8. The device of claim 1 wherein the side edges of each said puzzle piece are shaped irregularly in the nature of a jigsaw puzzle piece.

9. the device of claim 1 wherein the side edges of each said puzzle piece are shaped regularly in the nature of grid lines on a globe.

10. The device of claim 1 wherein the side edges of each said puzzle piece are shaped in the nature of an identifiable celestial phenomenon.

11. The device of claim 1 wherein said holding means includes magnetic material on one surface and magnets on the other surface of the facing surfaces of said puzzle pieces and said support member.

12. The device of claim 1 wherein said holding means includes Velcro material on the facing surfaces of said puzzle pieces and said support member.

13. The device of claim 1 wherein said holding means includes positioning said support member so that said concave support member upper surface faces upwardly, said puzzle pieces being assembled together and being gravitationally held downwardly against said support member upper surface.

* * * * *